United States Patent
Stumpf et al.

(10) Patent No.: US 11,567,754 B2
(45) Date of Patent: Jan. 31, 2023

(54) TECHNIQUES FOR NON-DISRUPTIVE OPERATING SYSTEM UPGRADE

(71) Applicant: VMWARE, INC., Palo Alto, CA (US)

(72) Inventors: Tobias Franz Rolf Stumpf, Munich (DE); Ashish Kaila, Palo Alto, CA (US); Adrian Drzewiecki, Palo Alto, CA (US); Vishnu Mohan Sekhar, Chennai (IN); Stanley Zhang, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 57 days.

(21) Appl. No.: 17/336,398

(22) Filed: Jun. 2, 2021

(65) Prior Publication Data
US 2022/0276858 A1    Sep. 1, 2022

(30) Foreign Application Priority Data

Mar. 1, 2021 (IN) .............................. 202141008544

(51) Int. Cl.
*G06F 8/656* (2018.01)
*G06F 9/48* (2006.01)
(Continued)

(52) U.S. Cl.
CPC ............ *G06F 8/656* (2018.02); *G06F 9/4555* (2013.01); *G06F 9/45558* (2013.01);
(Continued)

(58) Field of Classification Search
None
See application file for complete search history.

(56) References Cited

U.S. PATENT DOCUMENTS

| 8,024,426 B2 | 9/2011 | Trikoz et al. |
| 9,092,290 B1 | 7/2015 | Bono et al. |

(Continued)

FOREIGN PATENT DOCUMENTS

WO    2017160347 A1    9/2017

OTHER PUBLICATIONS

Franz Ferdinand Brasser, Mihai Bucicoiu, and Ahmad-Reza Sadeghi. Swap and play: Live updating hypervisors and its application to xen. In Proceedings of the 6th Edition of the ACM Workshop on Cloud Computing Security, CCSW '14, p. 33-44, New York, NY, USA, 2014. Association for Computing Machinery.

(Continued)

*Primary Examiner* — Qing Chen
(74) *Attorney, Agent, or Firm* — Patterson & Sheridan, LLP

(57) ABSTRACT

The disclosure provides an approach for a non-disruptive system upgrade. Embodiments include installing an upgraded version of an operating system (OS) on a computing system while a current version of the OS continues to run. Embodiments include entering a maintenance mode on the computing system, including preventing the addition of new applications and modifying the handling of storage operations on the computing system for the duration of the maintenance mode. Embodiments include, during the maintenance mode, configuring the upgraded version of the OS. Embodiments include, after configuring the upgraded version of the OS, suspending a subset of applications running on the computing system, transferring control over resources of the computing system to the upgraded version of the OS, and resuming the subset of the applications running on the computing system. Embodiments include exiting the maintenance mode on the computing system.

20 Claims, 7 Drawing Sheets

(51) Int. Cl.
  *G06F 9/455* (2018.01)
  *G06F 21/60* (2013.01)
  *G06F 12/0815* (2016.01)
  *G06F 9/4401* (2018.01)

(52) U.S. Cl.
  CPC ........ *G06F 9/4856* (2013.01); *G06F 12/0815* (2013.01); *G06F 21/604* (2013.01); *G06F 9/4401* (2013.01); *G06F 2009/45583* (2013.01); *G06F 2212/1032* (2013.01); *G06F 2221/2113* (2013.01)

(56) References Cited

U.S. PATENT DOCUMENTS

| | | | |
|---|---|---|---|
| 10,387,186 B2 | | 8/2019 | Venkatasubramanian et al. |
| 10,866,824 B2 | | 12/2020 | Granado |
| 2011/0145807 A1* | | 6/2011 | Molinie ............... G06F 8/65 717/170 |
| 2016/0117161 A1* | | 4/2016 | Parthasarathy ......... H04L 67/06 717/171 |
| 2018/0357061 A1* | | 12/2018 | Kludy ................. G06F 8/65 |
| 2021/0004000 A1* | | 1/2021 | Kalaskar ............ G06F 9/45545 |
| 2021/0157624 A1* | | 5/2021 | Saxena ............... G06F 9/45558 |

OTHER PUBLICATIONS

Alex Depoutovitch and Michael Stumm. Otherworld: giving applications a chance to survive OS kernel crashes. In European Conference on Computer Systems, Proceedings of the 5th European conference on Computer systems, EuroSys 2010, Paris, France, Apr. 13-16, 2010, pp. 181-194, 2010.
Spoorti Doddamani, Plush Sinha. Hui Lu, Tsu-Hsiang K. Cheng, Hardik H. Bagdi, and Kartik Gopalan. Fast and live hypervisor replacement. In Proceedings of the 15th ACM SIGPLAN/ SIGOPS International Conference on Virtual Execution Environments, VEE 2019, p. 45-58, New York, NY, USA, 2019. Association for Computing Machinery.
Kartik Gopalan, Rohit Kugve, Hardik Bagdi, Yaohui Hu, Daniel Williams, and Nilton Bila. Multi-hypervisor virtual machines: Enabling an ecosystem of hypervisor-level services. In 2017 USENIX Annual Technical Conference (USENIX ATC 17), pp. 235-249, Santa Clara, CA, Jul. 2017, USENIX Association.
Adhiraj Joshi, Swapnil Pimpale, Mandar Naik, Swapnil Rathi, and Kiran Pawar. Twin-linux: Running independent linux kernels simultaneously on separate cores of a multicore system. In Proceedings of the Linux Symposium, Jul. 13-16, 2010, Ottawa, Ontario, Canada, pp. 101-108. 2010.
VMware, Performance of vSphere 6.7 Scheduling Options. whilepaer https://www. vmware.com/content/dam/digitalmarketing/ vmware/en/pdf/techpaper/performance/ scheduler-options-vsphere67u2-perf.pdf.
Xiantao Zhang, Xiao Zheng, Zhi Wang, Qi Li, Junkang Fu, Yang Zhang, and Yibin Shen. Fast and scalable vmm live upgrade in large cloud infrastructure. In Proceedings of the Twenty-Fourth International Conference on Architectural Support for Programming Languages and Operating Systems, ASPLOS '19, p. 93-105, New York, NY, USA, 2019. Association for Computing Machinery.
Suspending and Resuming Your System Manually: <https://docs.oracle.com/cd/E19683-01/806-4743/estar-chapter-78/index.html>.
Device Power Management Basics; <https://www.kernel.org/doc/html/v4.12/driver-api/pm/devices.html>.
Distinguishing Fast Startup from Wake-from-Hibernation; https://docs.microsoft.com/en-us/windows-hardware/drivers/kernel/distinguishing-fast-startup-from-wake-from-hibernation.
International Search Report & Written Opinion dated Apr. 18, 2022 for International Application No. PCT/US2022/014024.

* cited by examiner

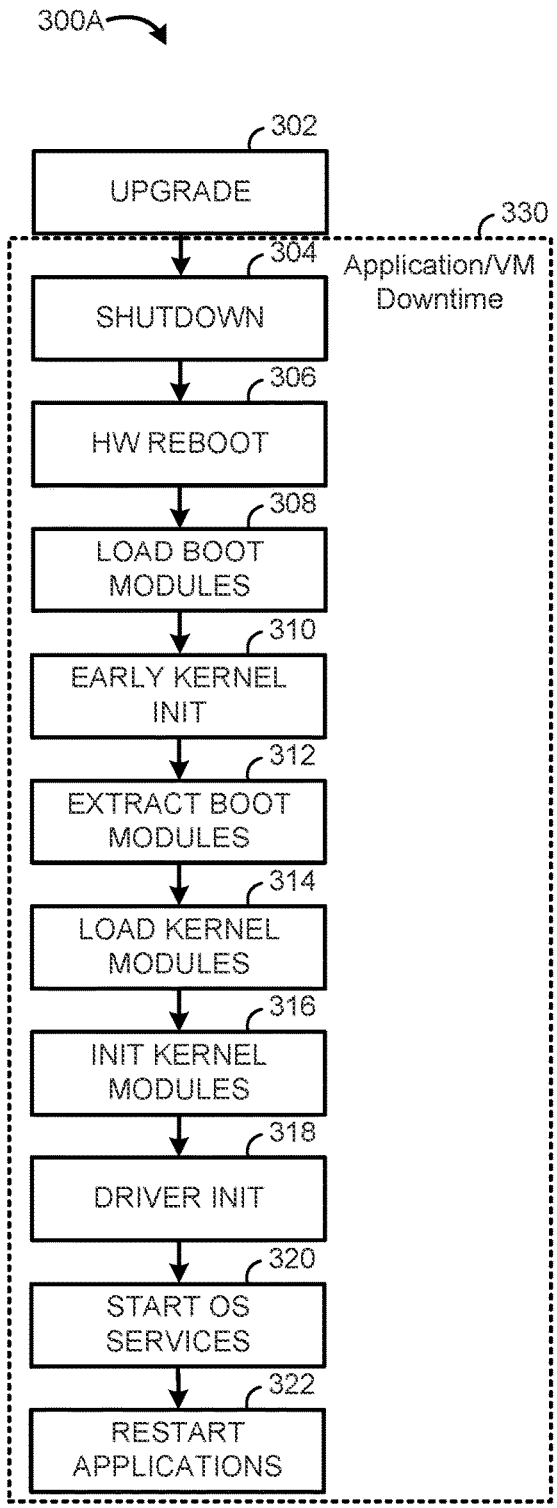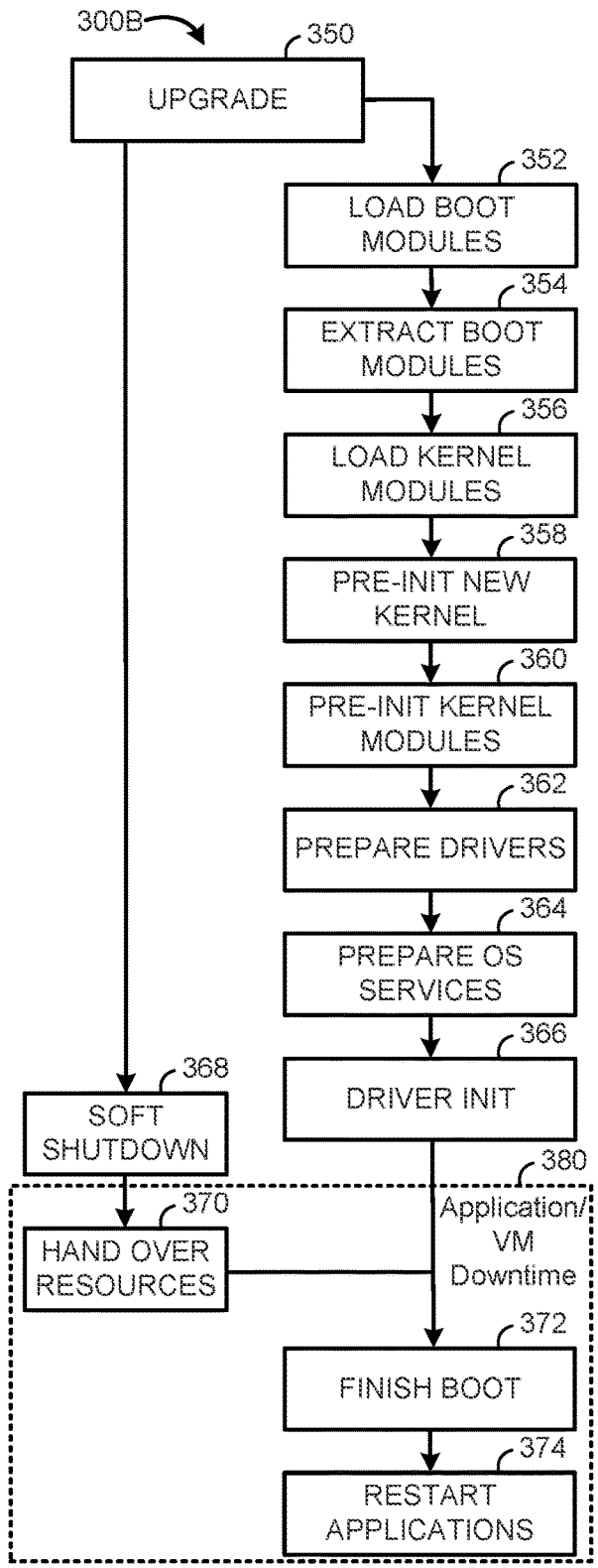
FIG. 3A
(Prior Art)
FIG. 3B

TECHNIQUES FOR NON-DISRUPTIVE OPERATING SYSTEM UPGRADE

RELATED APPLICATIONS

Benefit is claimed under 35 U.S.C. 119(a)-(d) to Foreign Application Serial No. 202141008544 filed in India entitled "TECHNIQUES FOR NON-DISRUPTIVE SYSTEM UPGRADE", on Mar. 1, 2021, by VMware, Inc., which is herein incorporated in its entirety by reference for all purposes.

BACKGROUND

Upgrading an operating system (OS) on a device conventionally leads to significant amounts of downtime for services running on the device. For example, services may need be shut down while the upgraded OS is installed, configured, and booted. Furthermore, device and driver state information is generally lost during the transition to the upgraded OS, leading to further inefficiencies. These drawbacks are particularly problematic in software-defined data centers in which large numbers of services are run and accessed by a plurality of users, and downtimes are not expected.

A software-defined data center (SDDC) may comprise a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software defined networks (SDNs), also referred to herein as logical overlay networks, that may span multiple hosts and are decoupled from the underlying physical network infrastructure.

Certain existing techniques for upgrading an OS on a host in an SDDC involve relocating all VCIs from the host to different endpoints in the SDCC for the duration of the upgrade. However, these techniques lead to downtimes while VCIs are being moved and require resources on separate hosts to be available for temporary placements of VCIs.

Accordingly, there is a need in the art for improved techniques for upgrading an OS, particularly in SDDCs.

BRIEF DESCRIPTION OF THE DRAWINGS

FIGS. 3A and 3B illustrate an existing technique and a new technique for upgrading an OS.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for non-intrusive system upgrades. In a first aspect, a "lightweight" maintenance mode is utilized for installing and configuring an upgraded version of an OS on a computing system while still allowing some operations to continue uninterrupted on the computing system. As described in more detail below with respect to FIG. 2, the lightweight maintenance mode restricts certain types of activity on the computing system, such as the addition of new applications and configuration changes, and may cause some or all storage I/O operations to be serviced externally over the network rather than locally on the computing system.

In a second aspect, a reboot-less OS upgrade is performed (e.g., during the maintenance mode). In certain embodiments, as described in more detail below with respect to FIG. 3, an upgraded version of an OS is installed and pre-initialized in a paravirtualized environment within the computing system while the existing version of the OS continues to run. The paravirtualized environment may be provided by a guest VCI running on the computing system (e.g., which may be a host computer). The OS may be a hypervisor. As described in more detail below with respect to FIG. 1, a hypervisor abstracts processor, memory, storage, and networking resources of a host device for multiple virtual computing instances (VCIs) that run concurrently on the same host device.

Once the upgraded OS is ready to replace the existing version of the OS, a third aspect involves a non-disruptive technique for transferring control over devices of the computing system to the upgraded OS without losing cache contents and state information. As described in more detail below with respect to FIG. 4, the contents of device caches are maintained and device and driver state information is saved in memory (which may be referred to as a "freeze" operation) prior to transferring control over devices of the computing system to the upgraded OS. The device and driver state information is then restored from memory (which may be referred to as a "thaw" operation) with the upgraded OS as the controlling OS of the computing system.

Accordingly, embodiments of the present disclosure constitute an improvement over existing techniques for upgrading an OS by allowing an OS to be upgraded while applications and devices continue to function through the upgrade process with minimal interruption.

Figure 1:
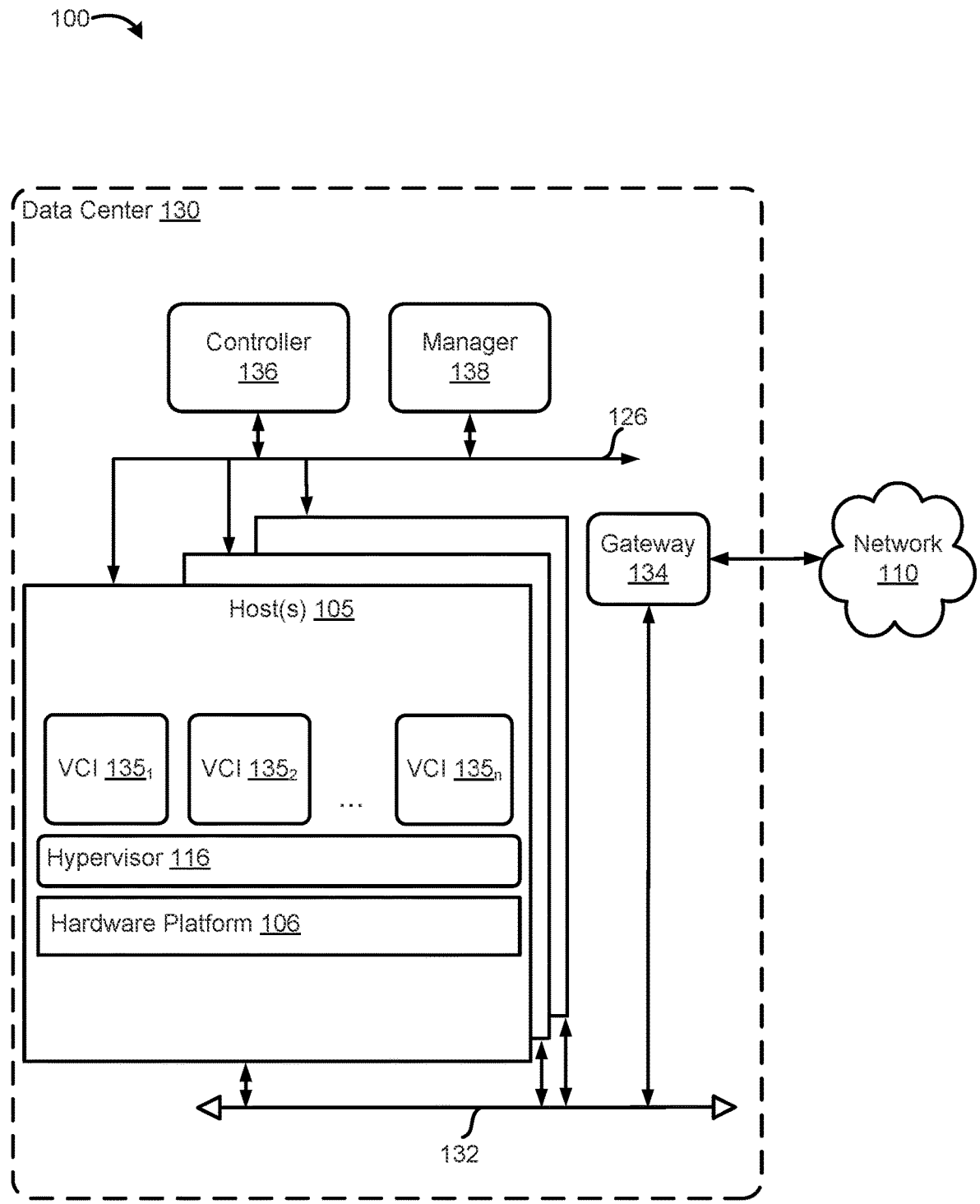
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of machines such as a local area network ("LAN") or a wide area network ("WAN"), a network of networks, such as the Internet, or any connection over which data may be transmitted.

Data center 130 generally represents a set of networked machines and may comprise a logical overlay network. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

It is noted that, while not shown, additional data centers may also be connected to data center 130 via network 110. Communication between the different data centers may be performed via gateways associated with the different data centers.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines. For example, a containerized microservice may run on a VCI 135.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 134 provides VCIs 135 and other components in data center 130 with connectivity to network 110, and is used to communicate with destinations external to data center 130 (not shown). Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

According to embodiments of the present disclosure, hypervisor 116 (or another OS running on a computing device, such as host 105 in data center 130) may be upgraded with minimal interruption to applications. For example, a lightweight maintenance mode may be entered on host 105, an upgraded version of hypervisor 116 may be installed and pre-initialized on host 105, and control of devices on host 105 may be transferred to the upgraded hypervisor 116 using a freeze-thaw approach in which cache contents and device and driver state are maintained through the upgrade process.

Figure 2A:
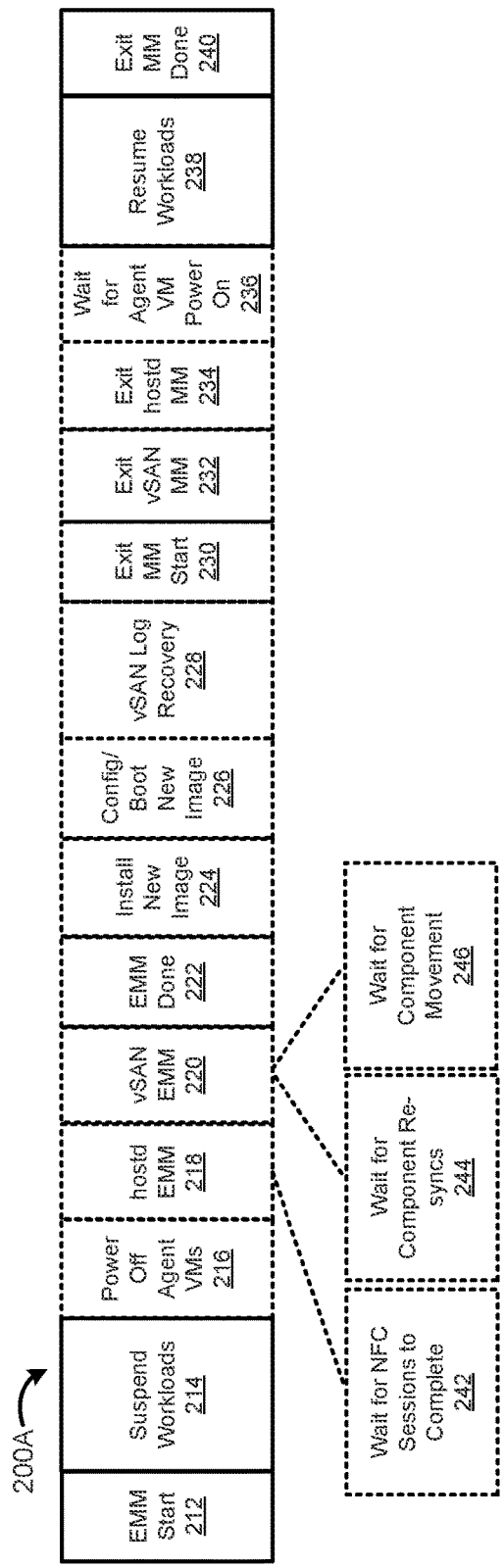
FIGS. 2A and 2B illustrate an existing technique and a new technique for a maintenance mode for OS upgrades.

FIG. 2A depicts an illustration 200A of an existing maintenance mode technique, which is improved upon by embodiments of the present disclosure described below with respect to FIG. 2B. It is noted that while certain embodiments are described with respect to FIGS. 2A and 2B as involving virtualized components (e.g., VMs, vSANs, and the like), techniques described herein may also be used to upgrade OSes in physical computing environments without virtualized components.

At 212, "entering maintenance mode" (EMM) starts on a computing system. EMM is the process by which maintenance mode is initialized on the computing system, such as to perform an OS upgrade. 214-220 represent the EMM process. At 214, all workloads on the computing system are suspended. At 216, all agent VMs are powered off. Agent VMs are VMs that provide services related to the virtual infrastructure, such as antivirus services, and support the functioning of other VMs. According to existing techniques, from 216-236, all services on the computing system are unavailable, as all workloads have been suspended and all agent VMs have been powered off.

At 218, the hostd process enters maintenance mode. The hostd process is an application that is responsible for managing many operations on a host computer, such as creation, powering on, and placement of VCIs. Before the hostd process can be placed in maintenance mode at 218, all network file copy (NFC) sessions of the hostd process must be completed at 242. NFC is a protocol used to transfer virtual disk data between hosts and management components in a data center.

At 220, the virtual storage area network (vSAN) enters maintenance mode. A vSAN is a logical storage network in which storage resources of host devices are abstracted into logical constructs. Before the vSAN can be placed in maintenance mode at 220, all component re-syncs and component movements in the vSAN must be completed at 244 and 246. Component re-syncs in a vSAN are generally triggered by policies, and may involve creating another version of a disk object and synchronizing it with the previous version. Component movements in a vSAN are generally performed to optimize placement of data.

At 222, the EMM process is completed, as maintenance mode has been entered on the computing system.

At 224, the new image is installed. For instance, an image of an upgraded version of the OS is installed on the computing system. At 226, the new image is configured and/or booted. For instance, code and an initial state of the upgraded OS may be configured, and then the upgraded OS may be booted as the controlling OS of the computing system.

At 228, vSAN log recovery is performed in order to recover the state of the vSAN on the upgraded OS. At 230, the exit maintenance mode process begins. The exit maintenance mode process comprises steps 232-238. At 232, the vSAN exits maintenance mode. At 234, the hostd process exits maintenance mode. At 236, the system waits for agent VMs to power on. Once agent VMs have powered on, workloads are resumed at 238. At this point, services on the computing system are once again available. At 240, the exit maintenance mode process is complete, and the OS has been upgraded.

Embodiments of the present disclosure improve upon the existing technique discussed above with respect to illustration 200A by significantly reducing downtime for services running on the computing system and allowing for a more seamless transition to an upgraded OS.

Figure 2B:
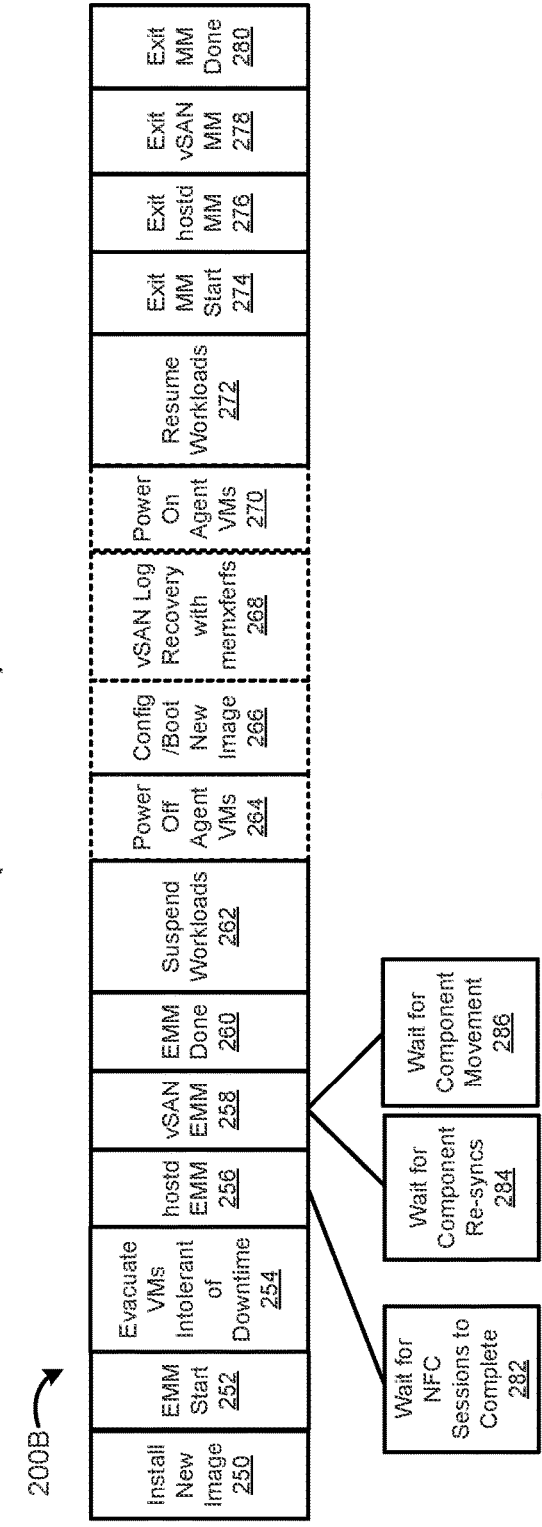

FIG. 2B depicts an illustration 200B of an improved maintenance mode technique according to embodiments of the present disclosure. In particular, illustration 200B shows the use of a lightweight maintenance mode that allows certain operations to continue with minimal interruption throughout an OS upgrade process.

At 250, a new image is installed on a computing system. For example, an image of an upgraded OS may be installed on the computing system. In one embodiment, as described in more detail below with respect to FIG. 3B, the new image may be installed in a paravirtualized environment within the computing system. In some embodiments, the new image may be installed in a separate bootbank from the current version of the OS. Operations on the computing system continue uninterrupted while the new image is installed.

At 252 the entering maintenance mode (EMM) process starts on the computing system. The EMM process comprises 254-258. At 254, any VMs that are intolerant of brief downtimes are evacuated from the computing system. For example, external-facing VMs (e.g., gateways) may not be able to tolerate any downtime at all due to the amount of traffic that they process, and so these VMs may be migrated to other hosts for the duration of the maintenance mode. However, unlike in the existing technique described above with respect to FIG. 2A, VMs that can tolerate small amounts of downtime may continue to run on the computing system during the lightweight maintenance mode.

At 256, the hostd process enters maintenance mode. Before the hostd process can be placed in maintenance mode at 256, all network file copy (NFC) sessions of the hostd process must be completed at 282. Entering maintenance mode on the hostd process may involve preventing new VCIs from being added to the computing system and/or restricting configuration changes on the computing system for the duration of maintenance mode.

At 258, the virtual storage area network (vSAN) enters maintenance mode. Before the vSAN can be placed in maintenance mode at 258, all component re-syncs and component movements in the vSAN must be completed at 284 and 286. Entering maintenance mode for the vSAN may involve changing the handling of storage operations (e.g., reads and writes) such that writes and at least some reads are handled outside of the computing system for the duration of maintenance mode, such as to a mirror copy of data. In some embodiments, reads of data that was written during maintenance mode may need to be handled externally, as the data would have been written externally rather than locally. In certain embodiments, all reads are handled outside of the computing system during maintenance mode, while in other embodiments reads of data that was written prior to entering maintenance mode are handled locally during maintenance mode.

At 260, the EMM process is complete, and maintenance mode has been entered on the computing system. Once the computing system has been placed into maintenance mode, the final stages of the OS upgrade process may be completed. In some embodiments, as described in more detail below with respect to FIG. 3B, the upgraded OS may be pre-initialized while the existing version of the OS continues to run without interruption until the time comes to transfer control of the computing system resources from the existing version of the OS to the upgraded OS.

At 262, workloads on the computing system are suspended. Thus, from 264-270, services on the computing system are unavailable. It is noted that this is a significantly shorter period of downtime than 216-236 of FIG. 2A, during which services were unavailable according to existing techniques. In practical application, the improved process described with respect to illustration 200B may involve only seconds of downtime as compared to the minutes or even hours of downtime that are common for existing techniques such as that described above with respect to illustration 200A of FIG. 2A.

At 264, agent VMs are powered off. At 266, the new image is configured and/or booted on the computing system. The process performed at 266 may correspond to the non-disruptive OS upgrade process described below with respect to FIG. 3B or to another process for configuring and/or booting an upgraded OS.

At 268, vSAN log recovery is performed in order to recover the state of the vSAN on the upgraded OS using a memory-transfer filesystem (memxferfs) process. Memxferfs is an in-memory filesystem, the contents of which can be shared between different OS versions. The data in the filesystem is valid until a full system reboot occurs. Any soft reboot mechanism can be used to preserve the contents of the filesystem across an OS reboot. The memxferfs process involves restoring the state of the vSAN based at least in part on data saved in memory, and requires less network traffic in order to restore the state of the vSAN.

AT 270, agent VMs are powered on. At 272, workloads are resumed on the computing system. From this point on, services are once again available on the computing system. At 274, the exit maintenance mode process begins. The exit maintenance mode process comprises steps 276-278. At 276, the hostd process exits maintenance mode. At 278, the vSAN exits maintenance mode. At 280, the exit maintenance mode process is complete, and the OS has been upgraded.

In some embodiments, the lightweight maintenance mode may be used to install and pre-initialize upgraded OSes on multiple hosts in parallel while services on the hosts continue uninterrupted.

FIG. 3A depicts an illustration 300A of an existing technique for upgrading an OS. The existing technique described with respect to illustration 300A is improved upon by embodiments of the present disclosure, as described below with respect to FIG. 3B.

At 302, an OS upgrade process begins, such as by installing an upgraded version of an OS on a computing system. At 304, the existing version of the OS is shut down, beginning a period of application and VM downtime 330.

At 304, a hardware reboot is performed. At 308, boot modules for the upgraded OS are loaded. At 310, early kernel initialization is performed. At 312, the boot modules are extracted. At 314, kernel modules are loaded. At 316, kernel modules are initialized. At 318, drivers are initialized. At 320, OS services are started. Finally, at 322, applications are restarted, thus ending the period of application and VM downtime and completing the upgrade process.

Embodiments of the present disclosure greatly reduce downtime for applications and VCIs by installing and pre-initializing an upgraded version of an OS in a paravirtualized environment while the current version of the OS continues to run.

FIG. 3B depicts an illustration 300B of an improved technique for upgrading an OS. It is noted that the improved technique for upgrading an operating system described herein with respect to FIG. 3B may be performed in conjunction with the lightweight maintenance mode technique described above with respect to FIG. 2B or may be performed independently of the lightweight maintenance mode technique.

At 350, a non-disruptive OS upgrade process begins by installing an upgraded version of an OS in a paravirtualized environment within a host computer while a current version of the OS continues to run on the host computer. Paravirtualization is a virtualization technology in which an OS (e.g., an upgraded version of an OS) is modified prior to installation inside a computing device in order to allow the OS within the computing device to share resources and successfully collaborate with other OSes (e.g., an existing version of the OS), rather than attempting to emulate an entire hardware environment.

The upgraded version of the OS may be granted supervisor privileges on the host, as it is intended to take over control of the host as the primary OS. In a traditional virtualization context, it would be unacceptable for the guest to be granted privileges outside of its virtualized environment, lest it have free reign over the host. However, in the present case, because the intent is to eventually transfer control of the host to the guest, the guest is assumed to be non-malicious and may be granted higher levels of privileges. The risk of executing compromised code on the guest may further be mitigated by digital signing technologies and other security measures. Whereas hypervisors usually aim for strong isolation guarantees between guests and host, the present solution can take a more cooperative approach to facilitate the eventual handover to the upgraded version of the OS.

At 352, boot modules for the upgraded version of the OS are loaded in the paravirtualized environment, and at 354 the boot modules are extracted. At 356, kernel modules for the upgraded version of the OS are loaded in the paravirtualized environment. At 358, the new kernel of the upgraded version of the OS is pre-initialized, at 360 the new kernel modules are pre-initialized, at 362 the drivers are prepared for the upgraded version of the OS (e.g., involving selecting and loading upgraded driver modules), at 364 services of the upgraded version of the OS are prepared, and at 366, drivers of the upgraded version of the OS are initialized (e.g., involving executing driver initialization code to get drivers into a state where they are ready to accept handed-over state information from the previous drivers). Pre-initializing the kernel and its modules, preparing drivers and services, and initializing drivers for the upgraded OS may involve executing an OS configuration application that uses application programming interface (API) calls to write measured values, represented as hashes of modules and settings, to the system and validates the kernel using a digital certificate. In some embodiments, a new address space is created for the OS configuration application that is separate from the address space of the kernel of the existing version of the OS so that the OS configuration application's execution is not able to corrupt the existing kernel's memory.

Interrupts may be initially disabled for the OS configuration application, and interrupts may instead be handled using paravirtualization techniques. During a regular boot, the OS configuration application expects to run with interrupts disabled, so the present technique similarly disables interrupts for the OS configuration application execution. However, the CPU executing the OS configuration application might receive an inter-processor interrupt (IPI) from another CPU executing kernel code, as the rest of the system is still operating as normal. Typical IPIs include CPU heartbeats and TLB invalidation requests. These requests cannot simply be ignored or delayed, as this would cause the existing kernel to eventually incorrectly determine that the CPU executing the OS configuration application has locked up. Similarly, the excessive deferral of timer and device interrupts may cause erratic behavior and degraded performance for the existing OS, perhaps even affecting workloads. Therefore, interrupts are forwarded to the kernel of the existing OS. The guest registers its own set of interrupt handlers during the OS configuration application execution, and these handlers perform a hypercall to provide the interrupt's context and state to the existing kernel, which uses its existing interrupt-handling infrastructure to take an appropriate action. A hypercall is a paravirtualization interface that allow a guest to request something from the running hypervisor, such as to fetch information or perform actions involving the host's shared resources. Hypercalls are commonly used with hypervisors, and a guest performs a hypercall by executing a special instruction that will trigger a mode switch from the guest to the hypervisor. The hypervisor then retrieves the guest's request from memory and/or CPU registers, performs the requested action, and returns control to the guest. As such, hypercalls are similar to syscalls, except that they must also cross the virtualization boundary. According to techniques described herein, the OS configuration application process must share host resources with the existing kernel. Instead of a mode switch, the OS configuration application process and the existing kernel perform context switches, saving and restoring their state across transitions.

Context switches may be performed manually, much like a kernel's scheduler would switch between running processes. While the OS configuration application runs with its own page tables, the existing kernel's page tables must be restored to run the existing kernel's code. Furthermore, any architectural state information (e.g., a global descriptor table or an interrupt descriptor table) that was modified for the OS configuration application's execution must be restored. This is necessary both because the existing kernel's tables are not mapped in the OS configuration application's address space, and because the OS configuration application requires different interrupt handling behavior.

In one example, a context switch between the OS configuration application and the existing kernel may operate as follows:

1. Save callee-saved registers;
2. Activate new address space's page tables;
3. Switch to new global descriptor table (GDT) and interrupt descriptor table (IDT);
4. Call target code, respecting typical calling conventions;
5. Return from call;
6. Restore GDT and IDT;
7. Restore address space; and
8. Restore callee-saved registers.

Thus, performing a hypercall during the upgrade process described herein includes performing a context switch from the OS configuration application to the existing kernel with the request in a particular CPU register. The existing kernel services the request and then switches back to the OS configuration application. The hypercall interface is easily extended by adding new request identifiers and handlers.

Utilizing hypercalls with embodiments of the present disclosure serves two purposes. First, as described above, hypercalls can be used in interrupt and exception handling. Secondly, hypercalls can be used for physical memory allocation. Unlike in a regular boot, the existing OS has already allocated memory for its own use. Thus, techniques described herein involve the guest avoiding conflicts by asking the existing OS to perform the allocation.

Control flow returns to the OS configuration application once interrupt handling is complete. The same mechanism used to handle interrupts may be used to handle exceptions, thereby enabling debugger support and the handling of unexpected errors.

Once the OS configuration application finishes executing, it will have set up the new kernel's code and initial state, thus completing steps 358-366. Techniques described herein offer a distinct advantage over existing techniques in the ease with which state can be transferred to the upgraded version of the OS for optimizing its initialization. State which has already been initialized by the existing version of the OS does not need to be recalculated, thus saving precious time. According to certain embodiments, the following state may be copied from the kernel of the existing version of the OS to the OS configuration application's memory, and then passed on to the upgraded kernel as necessary: hardware timer frequencies; kernel log buffer contents; and retired pages. The symmetry of the pre- and post-upgrade OS may even obviate the need for hypercalls, as the relevant data structures can simply be copied or passed by reference during the upgrade process.

Accordingly, after a soft shutdown of the existing version of the OS, resources of the host are handed over to the upgraded version of the OS at 370, thus beginning a brief period of application and VM downtime 380. Techniques for handing over control of resources to the upgraded version of the OS are described in more detail below with respect to FIG. 4. Finally, the boot process is finished at 372, and applications are restarted at 374, thus ending the brief period of application and VM downtime 380.

Figure 4:
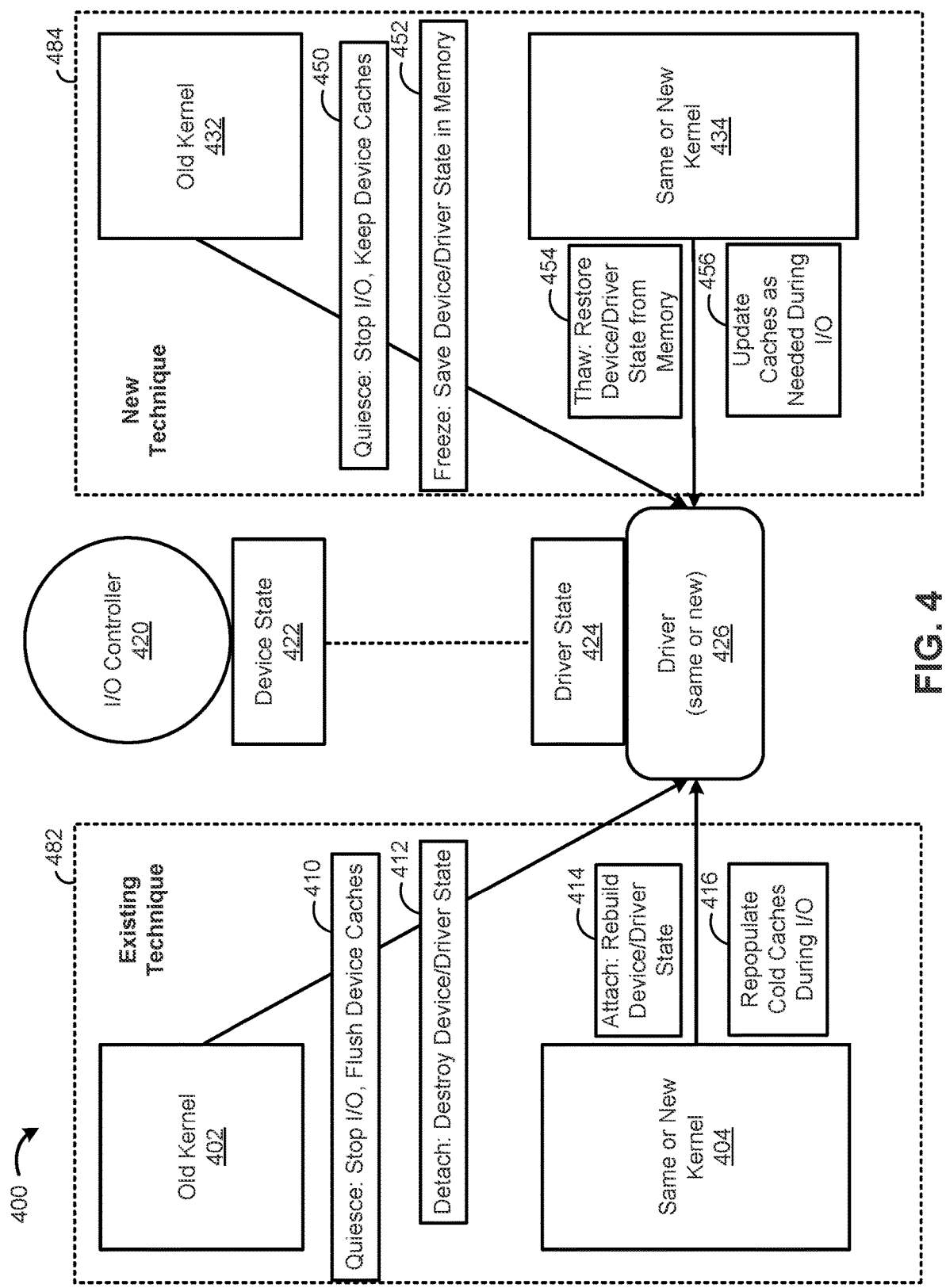
FIG. 4 illustrates an existing technique and a new technique for transferring control of resources to an upgraded OS.

FIG. 4 depicts an illustration 400 an existing technique 482 and a new technique 484 for transferring control of resources to an upgraded OS. It is noted that while certain embodiments are described with respect to an upgraded version of an existing OS, techniques described with respect to FIG. 4 may also be employed for transferring control of resources to a rebooted instance of the same version of an OS. Furthermore, techniques described with respect to FIG. 4 may also be employed independently of techniques described above with respect to FIGS. 2A and 3A. Resources of the computing device include an I/O controller 420 having a device state 422 (representing state information for I/O controller 420 and/or relating to one or more devices connected to I/O controller 420) and a driver 426 having a driver state 424 (representing driver state information for one or more drivers).

Existing techniques generally involve two phases. First is a shutdown phase of an "old" OS/hypervisor, where the OS/hypervisor notifies device drivers to quiesce the hardware at a minimum, and in some cases to go further and tear down the hardware setup. Next is an initialization phase of a "new" OS/hypervisor, where the same or new device drivers are loaded, wherein the driver goes through an initialization phase for itself and the hardware.

In particular, in the existing technique 482, control is being transferred from an old kernel 402 to either an upgraded version of the kernel or to the same kernel after a restart (same or new kernel 404). Prior to transferring control, the old kernel 402 interacts with the driver 426. First, at 410, the old kernel 402 interacts with driver 426 to perform a quiesce operation, stopping I/O operations and flushing device caches. Then, at 412, the old kernel 402 interacts with driver 426 to perform a detach operation, destroying device state 422 and driver state 424. Device state 422 and driver state 424 can include details such as interrupts allocated to the device, memory for intercommunication between device and driver, and device details gathered by the driver. Thus, in existing technique 482, device caches and device and driver state information is lost in the transfer process, and must be rebuilt from scratch.

At 414, same or new kernel 404 interacts with driver 426 (which, at this point, may be the same or a new driver after the upgrade process) to perform an attach operation, rebuilding device and driver state. At 416, same or new kernel 404 repopulates cold caches during I/O operations. This is because the device caches were flushed at 410, and became cold caches that must be repopulated from scratch as I/O traffic is processed.

New technique 484 addresses the issues of losing cache contents, device state, and driver state information that are present in existing technique 482. According to certain embodiments, during the shutdown phase a device is maintained in as near an initialized state as possible, including any warm device caches in the device and driver. Driver state, which can be related to the device state or unrelated but needed by the driver for its operation, is saved to memory by the old OS/hypervisor using a mechanism such as memxferfs. During the new OS/hypervisor and driver initialization phase, the device is given to the driver in near-initialized state. The new OS/hypervisor reads the old driver's saved state from memory, enabling the new driver to bring itself and the device to an operational state faster and with less setup work, also avoiding the need to repopulate cold caches in the device or driver. This reduces both shutdown and boot-up work and time, thus reducing overall reboot time for a system. The new OS/hypervisor and driver can be same or different from the old OS/hypervisor and driver. Both the old and new OS/hypervisor and driver need to agree on the format of the saved state in information in memory in order to effect a successful transition.

In particular, new technique 484 involves transferring control from an old kernel 432 to either an upgraded version of the same kernel or a different kernel altogether (same or new kernel 434). Prior to transferring control, the old kernel 432 interacts with the driver 426. First, at 450, the old kernel 432 interacts with driver 426 to perform a quiesce operation, stopping I/O operations but keeping device caches (e.g., not flushing the device caches). Then, at 452, the old kernel 432 interacts with driver 426 to perform a freeze operation, saving device state 422 and driver state 424 in memory.

At 454, same or new kernel 434 interacts with driver 426 (which, at this point, may be the same or a new driver after the upgrade process) to perform a thaw operation, restoring device state 422 and driver state 424 from memory. Then, at 456, same or new kernel 434 updates the device caches as needed during I/O, utilizing the existing contents of the caches that were maintained at 450. Thus, new technique 484 allows device caches as well as device state and driver state information to be maintained through the transfer of control.

Figure 5:
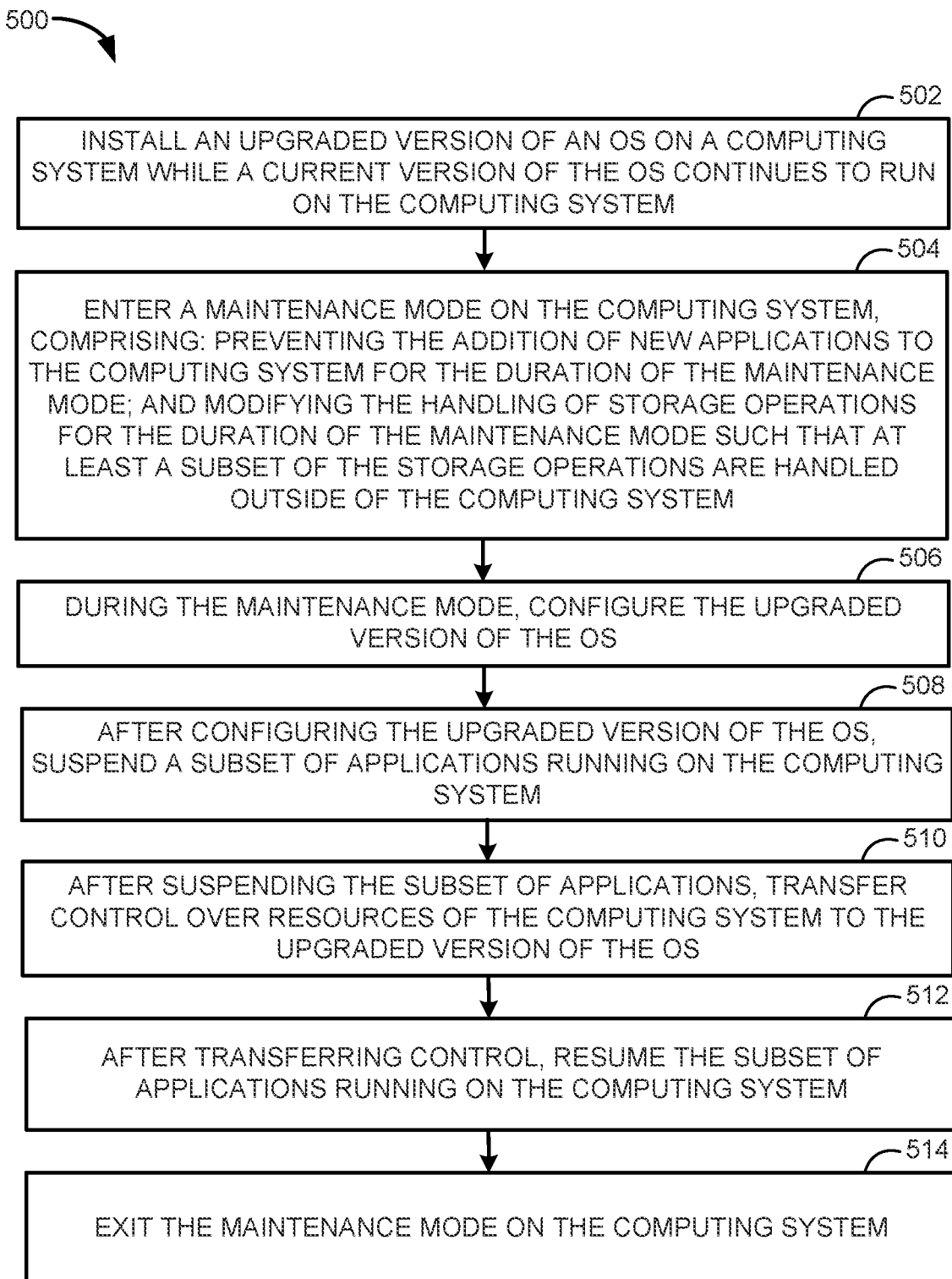
FIG. 5 depicts example operations related to a non-disruptive system upgrade.

FIG. 5 depicts example operations 500 related to a non-disruptive system upgrade. For example, operations 500 may be performed by one or more components in networking environment 100 of FIG. 1, and may correspond to techniques for entering a lightweight maintenance mode that are described above with respect to FIG. 2B.

At step 502, an upgraded version of an OS is installed on a computing system while the current version of the OS continues to run on the computing system. The computing system may, for instance, be a host computer, and the upgraded version of the OS may be an upgraded hypervisor that is installed in a paravirtualized environment within the host computer.

At step 504, a maintenance mode is entered on the computing system. The maintenance mode may be a lightweight maintenance mode, and entering the maintenance mode may include preventing the addition of new applications to the computing system for the duration of the maintenance mode. Entering the maintenance mode may also include modifying the handling of storage operations on the computing system for the duration of the maintenance mode such that the computing system acts like a disk-less system and any storage operations are serviced over the network. In some embodiments, reads of data written to the computing system prior to entering the maintenance mode are still serviced locally during the maintenance mode. Entering the maintenance mode may further include restricting configuration changes on the computing system for the duration of the maintenance mode. In certain embodiments, entering the maintenance mode also includes moving a subset of applications (e.g., VCIs) running on the computing system to a different computing system for the duration of the maintenance mode, such as based on a determination that the subset of applications will not tolerate the amount of downtime required to complete the upgrade process.

At step 506, during the maintenance mode, the upgraded version of the OS is configured. Configuring the upgraded version of the OS may include techniques described above with respect to FIGS. 3A and 3B.

At step 508, after configuring the upgraded version of the OS, a subset of applications running on the computing system is suspended. For instance, the subset of applications may be VCIs, and may include VCIs that were not moved to a different computing system for the duration of the maintenance mode.

At step 510, after suspending the subset of applications, control over resources of the computing system is transferred to the upgraded version of the OS. Transferring control may involve techniques described above with respect to FIG. 4. For instance, contents of device caches may be maintained and device and driver state information may be saved in memory during the transfer of control and restored from memory after the transfer is complete.

At step 512, after transferring control, the subset of applications running on the computing system is resumed. Furthermore, any applications moved off of the computing system as part of entering the maintenance mode may be moved back to the computing system.

At step 514, the maintenance mode is exited on the computing system.

Figure 6:
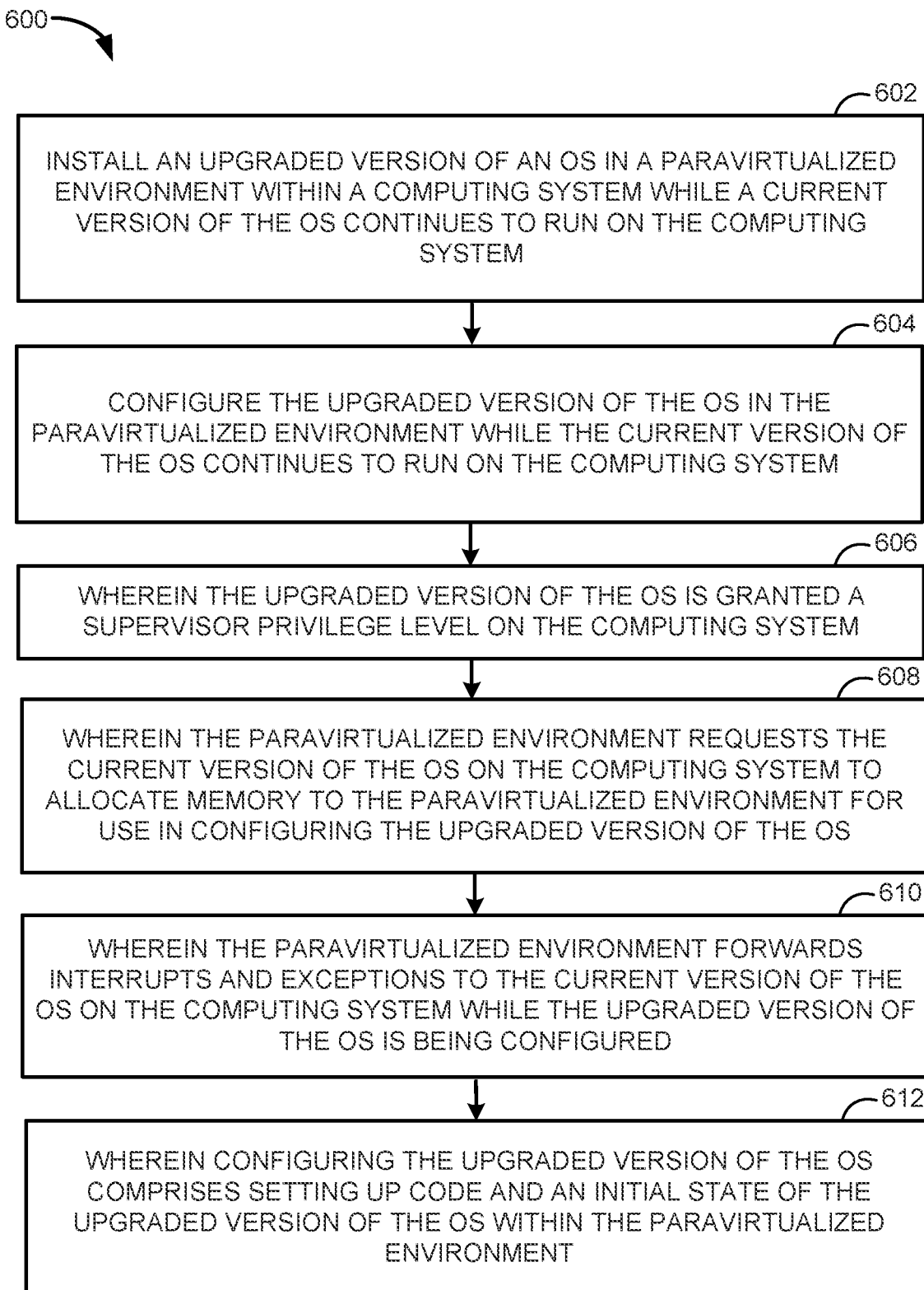
FIG. 6 depicts additional example operations related to a non-disruptive system upgrade.

FIG. 6 depicts additional example operations 600 related to a non-disruptive system upgrade. For example, operations 600 may be performed by one or more components in networking environment 100 of FIG. 1, and may correspond to techniques for entering upgrading an OS that are described above with respect to FIG. 3B.

At step 602, an upgraded version of an OS is installed in a paravirtualized environment within a computing system while a current version of the OS continues to run on the computing system.

At step 604, the upgraded version of the OS is configured in the paravirtualized environment while the current version of the OS continues to run on the computing system.

Step 606 specifies that the upgraded version of the OS is granted a supervisor privilege level on the computing system.

Step 608 specifies that the paravirtualized environment requests the current version of the OS on the computing system to allocate memory to the paravirtualized environment for use in configuring the upgraded version of the OS.

Step 610 specifies that the paravirtualized environment forwards interrupts and exceptions to the current version of the OS on the computing system while the upgraded version of the OS is being configures.

Step 612 specifies that configuring the upgraded version of the OS comprises setting up code and an initial state of the upgraded version of the OS within the paravirtualized environment.

Figure 7:
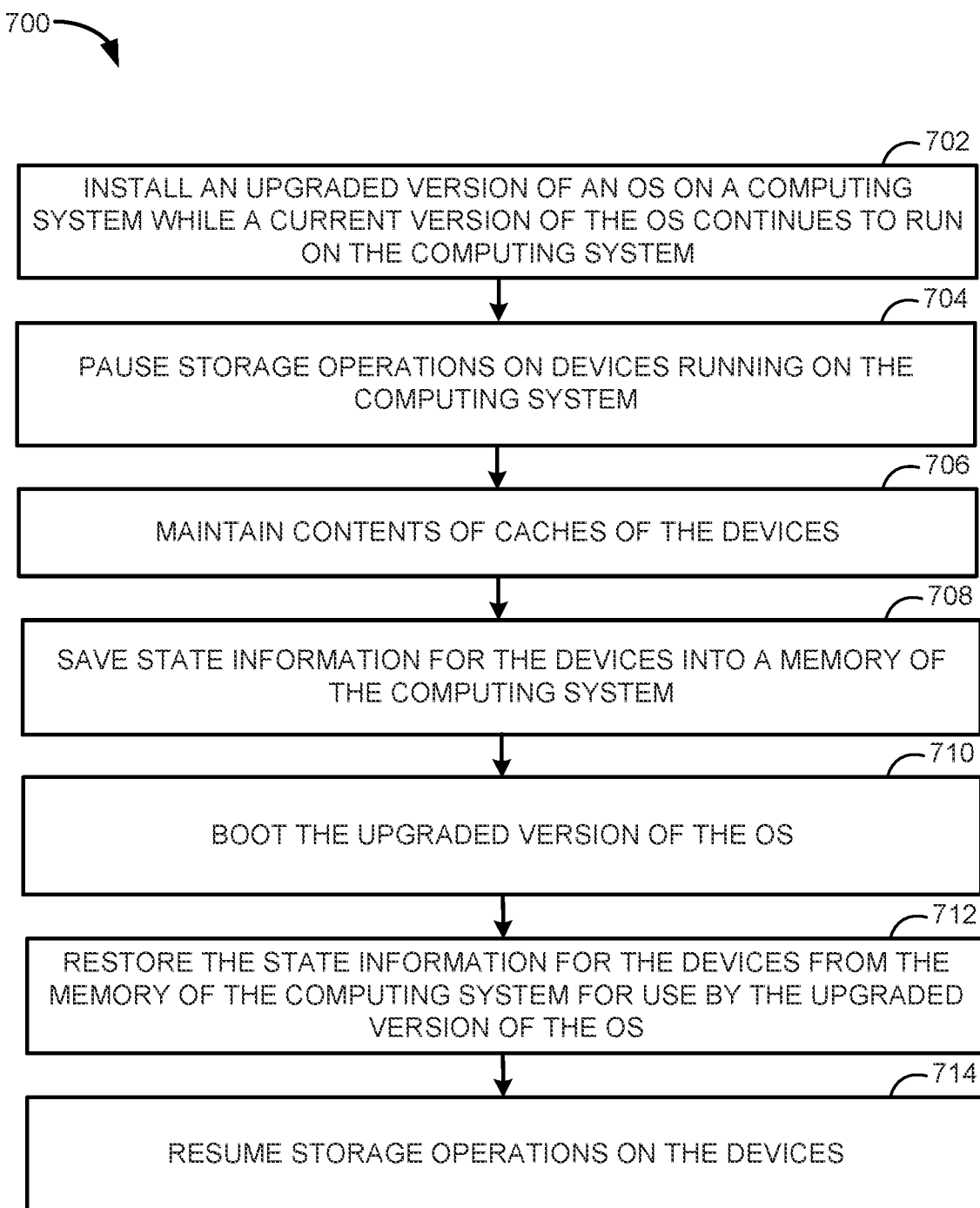
FIG. 7 depicts additional example operations related to a non-disruptive system upgrade.

FIG. 7 depicts additional example operations 700 related to a non-disruptive system upgrade. For example, operations 700 may be performed by one or more components in networking environment 100 of FIG. 1, and may correspond to techniques for transferring control over resources of a computing system to an upgraded version of an OS that are described above with respect to FIG. 4.

At step 702, an upgraded version of an OS is installed on a computing system while a current version of the OS continues to run on the computing system.

At step 704, storage operations (e.g., I/O operations) are paused on devices running on the computing system.

At step 706, contents of caches of the devices are maintained.

At step 708, state information for the devices is saved into a memory of the computing system.

At step 710, the upgraded version of the OS is booted.

At step 712, the state information for the devices is restored from the memory of the computing system for use by the upgraded version of the OS.

At step 714, storage operations are resumed on the devices.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of performing a non-disruptive operating system upgrade, comprising:
  installing an upgraded version of an operating system on a computing system while a current version of the operating system continues to run on the computing system;
  entering a maintenance mode on the computing system, comprising:
    preventing addition of new applications to the computing system for a duration of the maintenance mode on the computing system; and
    modifying handling of storage operations on the computing system for the duration of the maintenance mode on the computing system such that at least a subset of the storage operations on the computing system is handled outside of the computing system;
  during the maintenance mode on the computing system:
    configuring the upgraded version of the operating system on the computing system;
    after configuring the upgraded version of the operating system on the computing system, suspending a subset of applications running on the computing system;
    after suspending the subset of applications running on the computing system, transferring control over resources of the computing system to the upgraded version of the operating system on the computing system; and
    after transferring control over the resources of the computing system to the upgraded version of the operating system on the computing system, resuming the subset of applications running on the computing system; and
  exiting the maintenance mode on the computing system.

2. The method of claim 1, wherein entering the maintenance mode on the computing system further comprises:
identifying an additional subset of applications running on the computing system that will not tolerate downtimes exceeding a threshold; and
moving the additional subset of applications off of the computing system for at least the duration of the maintenance mode on the computing system.

3. The method of claim 1, wherein entering the maintenance mode on the computing system further comprises restricting configuration changes on the computing system for the duration of the maintenance mode on the computing system.

4. The method of claim 1, further comprising restoring a state of one or more storage entities on the computing system based on logs.

5. The method of claim 1, wherein installing the upgraded version of the operating system on the computing system comprises installing the upgraded version of the operating system in a paravirtualized environment within the computing system.

6. The method of claim 5, wherein configuring the upgraded version of the operating system on the computing system comprises setting up code and an initial state of the upgraded version of the operating system in the paravirtualized environment within the computing system.

7. The method of claim 5, wherein the upgraded version of the operating system in the paravirtualized environment within the computing system is granted a supervisor privilege level on the computing system.

8. The method of claim 5, wherein the paravirtualized environment within the computing system requests the current version of the operating system on the computing system to allocate memory to the paravirtualized environment within the computing system for use in configuring the upgraded version of the operating system on the computing system.

9. The method of claim 5, wherein the paravirtualized environment within the computing system forwards interrupts and exceptions to the current version of the operating system on the computing system while the upgraded version of the operating system on the computing system is being configured.

10. The method of claim 1, wherein transferring control over the resources of the computing system to the upgraded version of the operating system on the computing system comprises:
pausing storage operations on devices running on the computing system;
maintaining contents of caches of the devices running on the computing system;
saving state information for the devices running on the computing system into a memory of the computing system;
booting the upgraded version of the operating system on the computing system;
restoring the state information for the devices running on the computing system from the memory of the computing system for use by the upgraded version of the operating system on the computing system; and
resuming storage operations on the devices running on the computing system.

11. A system for performing a non-disruptive operating system upgrade, comprising:
at least one memory; and
at least one processor coupled to the at least one memory, the at least one processor and the at least one memory configured to:
install an upgraded version of an operating system on a computing system while a current version of the operating system continues to run on the computing system;
enter a maintenance mode on the computing system, comprising:
preventing addition of new applications to the computing system for a duration of the maintenance mode on the computing system; and
modifying handling of storage operations on the computing system for the duration of the maintenance mode on the computing system such that at least a subset of the storage operations on the computing system is handled outside of the computing system;
during the maintenance mode on the computing system:
configuring the upgraded version of the operating system on the computing system;
after configuring the upgraded version of the operating system on the computing system, suspending a subset of applications running on the computing system;
after suspending the subset of applications running on the computing system, transferring control over resources of the computing system to the upgraded version of the operating system on the computing system; and
after transferring control over the resources of the computing system to the upgraded version of the operating system on the computing system, resuming the subset of applications running on the computing system; and
exit the maintenance mode on the computing system.

12. The system of claim 11, wherein entering the maintenance mode on the computing system further comprises:
identifying an additional subset of applications running on the computing system that will not tolerate downtimes exceeding a threshold; and
moving the additional subset of applications off of the computing system for at least the duration of the maintenance mode on the computing system.

13. The system of claim 11, wherein entering the maintenance mode on the computing system further comprises restricting configuration changes on the computing system for the duration of the maintenance mode on the computing system.

14. The system of claim 11, wherein the at least one processor and the at least one memory are further configured to restore a state of one or more storage entities on the computing system based on logs.

15. The system of claim 11, wherein installing the upgraded version of the operating system on the computing system comprises installing the upgraded version of the operating system in a paravirtualized environment within the computing system.

16. The system of claim 15, wherein configuring the upgraded version of the operating system on the computing system comprises setting up code and an initial state of the upgraded version of the operating system in the paravirtualized environment within the computing system.

17. The system of claim 15, wherein the upgraded version of the operating system in the paravirtualized environment within the computing system is granted a supervisor privilege level on the computing system.

18. The system of claim 15, wherein the paravirtualized environment within the computing system requests the current version of the operating system on the computing system to allocate memory to the paravirtualized environment within the computing system for use in configuring the upgraded version of the operating system on the computing system.

19. The system of claim 15, wherein the paravirtualized environment within the computing system forwards interrupts and exceptions to the current version of the operating system on the computing system while the upgraded version of the operating system on the computing system is being configured.

20. A non-transitory computer readable medium storing instructions that, when executed by one or more processors, cause the one or more processors to:
  install an upgraded version of an operating system on a computing system while a current version of the operating system continues to run on the computing system;
  enter a maintenance mode on the computing system, comprising:
    preventing addition of new applications to the computing system for a duration of the maintenance mode on the computing system; and
    modifying handling of storage operations on the computing system for the duration of the maintenance mode on the computing system such that at least a subset of the storage operations on the computing system is handled outside of the computing system;
  during the maintenance mode on the computing system:
    configuring the upgraded version of the operating system on the computing system;
    after configuring the upgraded version of the operating system on the computing system, suspending a subset of applications running on the computing system;
    after suspending the subset of applications running on the computing system, transferring control over resources of the computing system to the upgraded version of the operating system on the computing system; and
    after transferring control over the resources of the computing system to the upgraded version of the operating system on the computing system, resuming the subset of applications running on the computing system; and
  exit the maintenance mode on the computing system.

* * * * *